US009695981B2

(12) United States Patent
Au et al.

(10) Patent No.: US 9,695,981 B2
(45) Date of Patent: *Jul. 4, 2017

(54) IMAGE RECOGNITION FOR PERSONAL PROTECTIVE EQUIPMENT COMPLIANCE ENFORCEMENT IN WORK AREAS

(75) Inventors: Kwong Wing Au, Bloomington, MN (US); Pedro Davalos, Plymouth, MN (US); Sharath Venkatesha, Minnetonka, MN (US); Himanshu Khurana, Plymouth, MN (US); Saad J. Bedros, West St. Paul, MN (US); Mohammed Ibrahim Mohideen, Karnataka (IN); Mahesh Kumar Gellaboina, Andhra Pradesh (IN); Adishesha CS, Karnataka (IN); Cleopatra Cabuz, Eden Prairie, MN (US)

(73) Assignee: Honeywell International Inc., Morris Plains, NJ (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/452,596

(22) Filed: Apr. 20, 2012

(65) Prior Publication Data
US 2013/0282609 A1 Oct. 24, 2013

(51) Int. Cl.
*G06Q 10/10* (2012.01)
*G06Q 30/02* (2012.01)
(Continued)

(52) U.S. Cl.
CPC ............... *F16P 3/142* (2013.01); *G06K 9/00* (2013.01); *G06K 9/6211* (2013.01);
(Continued)

(58) Field of Classification Search
CPC .................................................. G06Q 50/265
(Continued)

(56) References Cited

U.S. PATENT DOCUMENTS

| 5,164,707 A | 11/1992 | Rasmussen et al. |
| 5,825,283 A * | 10/1998 | Camhi ........................ 340/438 |

(Continued)

FOREIGN PATENT DOCUMENTS

| EP | 0689357 A1 | 12/1995 |
| GB | 2250156 A | 5/1992 |

(Continued)

OTHER PUBLICATIONS

Wu et al., "Glasses Detection by Boosting Simple Wavelet Features", Dept. of Computer Science and Technology, Tsinghua University, State Key Laboratory of Intelligent Technology and Systems, Beijing 100084, PR China; email: ahz@mail.tsinghua.edu.cn; 4 pages.

(Continued)

*Primary Examiner* — Jonathan Ouellette
(74) *Attorney, Agent, or Firm* — Conley Rose, P.C.; Kristin Jordan Harkins

(57) ABSTRACT

A method comprises receiving one or more images of a person from one or more image capture devices in response to an input, identifying one or more items of personal protective equipment in the one or more images, determining the positioning of the one or more items of personal protective equipment relative to the person in the one or more images, and verifying compliance with personal protective equipment standards based on the one or more identified items of personal protective equipment and the positioning of the one or more items of personal protective equipment.

17 Claims, 6 Drawing Sheets

(51) Int. Cl.

| | |
|---|---|
| *G06Q 40/08* | (2012.01) |
| *G06Q 10/08* | (2012.01) |
| *F16P 3/14* | (2006.01) |
| *G06Q 50/26* | (2012.01) |
| *G06K 9/00* | (2006.01) |
| *G06K 9/62* | (2006.01) |
| G08B 21/02 | (2006.01) |
| G08B 21/24 | (2006.01) |
| G07C 9/00 | (2006.01) |
| G07C 1/10 | (2006.01) |

(52) U.S. Cl.
CPC ............ *G06Q 50/265* (2013.01); *G07C 1/10* (2013.01); *G07C 9/00166* (2013.01); *G08B 21/02* (2013.01); *G08B 21/24* (2013.01)

(58) Field of Classification Search
USPC .................................. 705/325, 500, 1.1–912
See application file for complete search history.

(56) References Cited

U.S. PATENT DOCUMENTS

| | | |
|---|---|---|
| 2003/0197608 A1 | 10/2003 | Rudhard et al. |
| 2006/0107296 A1 | 5/2006 | Mock et al. |
| 2006/0252999 A1 | 11/2006 | Devaul et al. |
| 2008/0189142 A1 | 8/2008 | Brown et al. |
| 2009/0040014 A1 | 2/2009 | Knopf et al. |
| 2009/0161918 A1* | 6/2009 | Heller et al. .................. 382/115 |
| 2009/0224868 A1 | 9/2009 | Liu et al. |
| 2010/0241465 A1 | 9/2010 | Amigo et al. |
| 2010/0245554 A1 | 9/2010 | Nam et al. |
| 2011/0007950 A1* | 1/2011 | Deutsch ........................ 382/111 |
| 2011/0288659 A1 | 11/2011 | Nelson et al. |
| 2012/0146789 A1* | 6/2012 | De Luca et al. .............. 340/540 |

FOREIGN PATENT DOCUMENTS

| | | |
|---|---|---|
| JP | 2010033141 | 12/2010 |
| WO | 2011123741 A2 | 10/2011 |

OTHER PUBLICATIONS

Du et al., "Hard Hat Detection in Video Sequences Based on Face Features, Motion and Color Information"; IntelliView Technologies, Inc., 808-55 Avenue NE, Calgary, Alberta, Canada T2E 6Y4; du@intelliview.ca; pp. 25-29.

Limei et al.; "A Method for Detecting Miners Based on Helmets Detection in Underground Coal Mine Videos"; Mining Science and Technology (China); published by Elsevier B.V. on behalf of China University of Mining & Technology; www.elsevier.com/locate/mstc; 4 pages.

European Search Report, Application No. EP 13 16 2639 and Annex to European Search Report, dated Jun. 25, 2013; 3 pages.

European Examination Report, Application No. EP 13 16 2639, dated Jul. 15, 2013; 9 pages.

* cited by examiner

IMAGE RECOGNITION FOR PERSONAL PROTECTIVE EQUIPMENT COMPLIANCE ENFORCEMENT IN WORK AREAS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many workplace environments include hazardous areas that can present health, safety, and environmental risks for employees. For example, in a manufacturing environment, industrial equipment with moving parts can be a serious threat to worker safety. In other cases, there are environments in which a high value work product needs to be protected from the employees. For example, food processing and packaging plants, pharmaceutical production plants, various semiconductor plants and the like may all require the employees to wear protective equipment to prevent contamination of the product. To help prevent worker injury and/or product contamination, workplace safety rules may require that each individual use and/or wear the appropriate personal protective equipment (PPE) in various work areas of a production facility.

While PPE is often an effective means of protecting employees, PPE is only effective when it is used according to its intended function. Thus, non-compliance with PPE usage guidelines may result in various workplace injuries. In order to improve compliance, various approaches have been proposed to improve employee compliance with PPE usage standards. One method includes the use of RFID (Radio Frequency Identification) technology to help promote worker compliance with workplace safety rules. However, RFID technology merely detects the presence of the PPE in an area and does not verify that the PPE is being worn at all times while the employee is within the hazardous area.

SUMMARY

In an embodiment, a method comprises receiving one or more images of a person from one or more image capture devices in response to an input, identifying one or more items of personal protective equipment in the one or more images, determining the positioning of the one or more items of personal protective equipment relative to the person in the one or more images, and verifying compliance with personal protective equipment standards based on the one or more identified items of personal protective equipment and the positioning of the one or more items of personal protective equipment.

In an embodiment, a personal protective equipment compliance system comprises a memory comprising a non-transitory, computer readable media, a processor, and an image recognition processing tool. The image recognition processing tool, when executed by the processor, configures the processor to receive a trigger signal from a trigger device, receive one or more images from an image capture device in response to receiving the trigger signal, detect one or more items of personal protective equipment within the one or more images, detect the positioning of the one or more items of personal protective equipment on a person within the one or more images when the one or more items of personal protective equipment are detected, identify the type of the one or more items of personal protective equipment when the one or more items of personal protective equipment are detected, verify compliance with one or more personal protective equipment standards based on the positioning of the one or more items of personal protective equipment and the type of the one or more items of personal protective equipment, and send an output signal to a device indicative of the compliance verification.

In an embodiment, a personal protective equipment compliance system comprises a memory comprising a non-transitory, computer readable media, a processor, and an image recognition processing tool. The image recognition processing tool, when executed by the processor, configures the processor to determine a location of a person within a work area based on a signal from a location device, direct one or more image capture devices to the location of the person, receive one or more images from the one or more image capture devices, detect one or more items of personal protective equipment within the one or more images, detect the positioning of the one or more items of personal protective equipment on a person within the one or more images when the one or more items of personal protective equipment are detected, and verify compliance with one or more personal protective equipment standards based on the positioning of the one or more items of personal protective equipment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Traditional systems merely detect the presence of an item of PPE in an area and do not verify that the PPE is being worn at all times while a person is within a work area. Accordingly, systems and methods are disclosed herein that can be used to verify that a person both possesses and wears the appropriate PPE prior to allowing access to the work area. As further disclosed herein, the systems and methods can identify both that the appropriate kind of PPE is being properly worn as well as identifying a specific type of PPE. For example, the present systems and methods can allow for the verification that a person is properly wearing eye protection prior to being granted access to a work area as well as verifying that the eye protection is the properly rated type of laser eye protection for the specific work area the person is entering.

Moreover, the present systems and methods can allow for a location determination of a user within a work area, for the automatic identification of the person, and for the verification of the proper use of PPE by the person within the work area. The systems described herein can be combined to provide a comprehensive system for verifying compliance with PPE standards in work areas, and/or used separately to verify compliance with PPE standards by various people. The results of the present systems and methods can be used to provide records of PPE compliance, determine the appropriate training for people within the work area, and/or identify those people not complying with the PPE standards. These and other advantages are more fully described herein.

Figure 1:
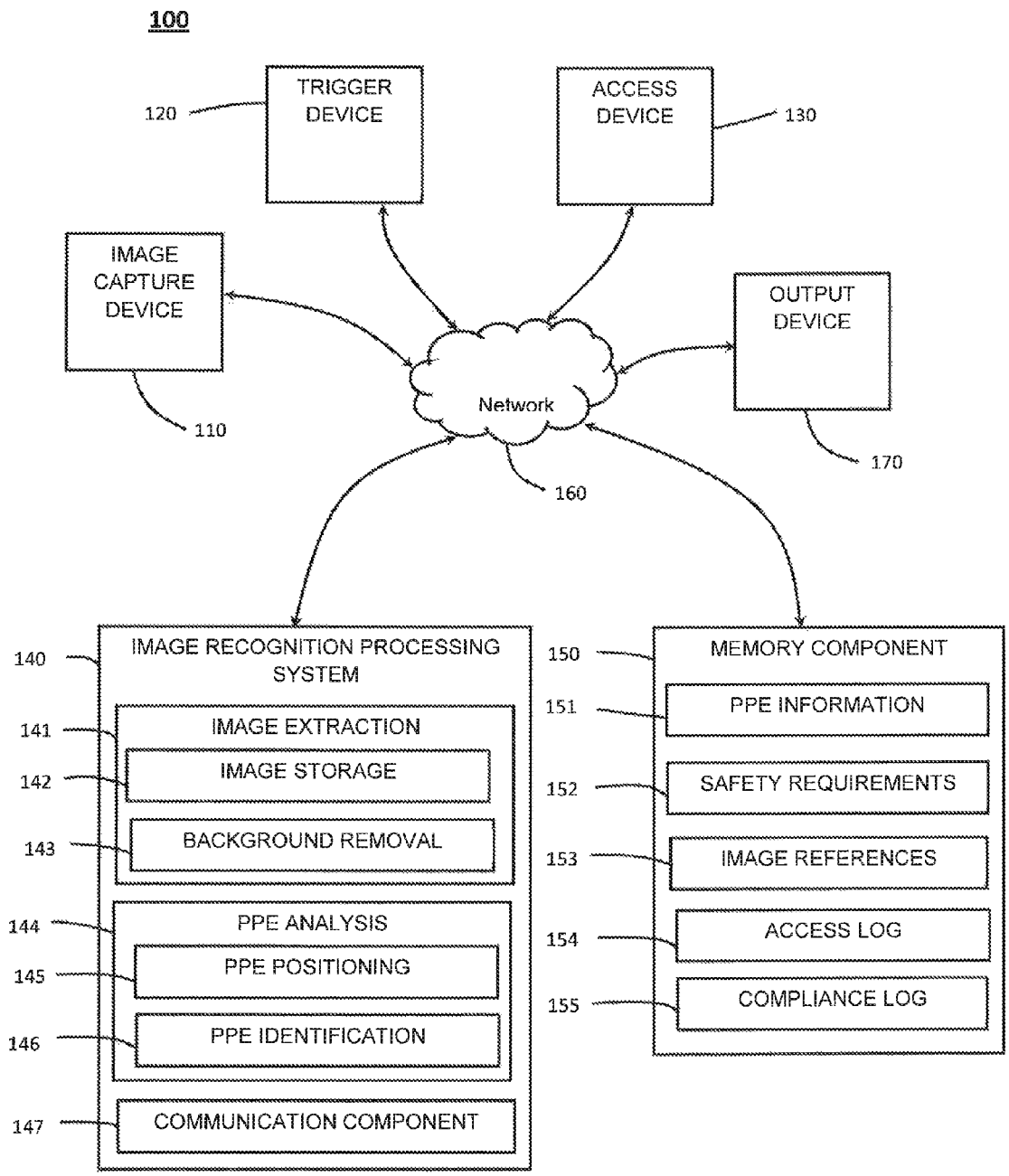
FIG. 1 illustrates a schematic view of an embodiment of an image recognition system.

FIG. 1 illustrates an embodiment of an image recognition system 100 configured to detect compliance with standards for using PPE. The system 100 includes an image capture device 110, a trigger device 120, an access device 130, an image recognition processing system 140, an output device 170, and a memory 150 all coupled by a network 160. In an embodiment, any of the elements may be directly coupled rather than be coupled through a network or network elements, and one or more of the components be integrated into a single unit.

The image recognition system 100 is configured to detect compliance with the use of PPE by one or more people. Various industries may utilize one or more kinds of PPE. The types of PPE may vary from one industry to another, and the PPE standards can vary within an industry depending on the particular work area in which the PPE is being used. For example, different locations within a work area can have different safe working practice standards so that a first location immediately surrounding a particular machine in a factory may have one set of PPE standards while a location outside of a specified distance from the machine may have a different set of PPE standards. Typical work areas may have a plurality of locations or zones. For example, a typical industrial facility may have a plurality of differently zoned areas with varying PPE standards. Alternatively, a work area can have uniform PPE standards throughout the entire area.

In an embodiment, the image recognition system 100 may be used to verify compliance with the PPE standards for one or more kinds of PPE including, but not limited to, glasses, goggles, ear plugs, ear muffs, face masks, respirators, hair nets, hard hats, wrist bands, gloves, skirts, gowns, aprons, shoes, boots, safety harnesses, safety suits, chemical suits, and any combinations thereof. Each kind of PPE may include specific PPE types. For example, glasses may include specific types of glasses including shatter resistant glasses, light filtering glasses, laser safety glasses, etc. Various sub-groupings of the types are also possible. For example, specific glasses or goggles may be used for particular laser frequency ranges in a laser emissive area. Similarly, materials used to form gloves, suits, etc. may each have different chemically resistant properties, making not only the specific type of PPE important, but in some embodiments, also the specific sub-type of the PPE. A hierarchy of PPE kind, type, and sub-types may then be considered for any particular usage. The image recognition system 100 described herein may be used to not only identify the kind of PPE but also the specific type of PPE, and in some embodiments, one or more sub-types of PPE. While the description of the image recognition system 100 may provide examples of the PPE referring to goggles, it is expressly understood that any other PPE types may also be used with the image recognition system 100 described herein.

The image capture device 110 generally comprises an imaging sensor for capturing one or more images that are represented by image data and/or can be converted into image data. In an embodiment, the image capture device 110 comprises an electronic device (e.g., a camera or other image capturing device) used to capture an image of an individual triggering the trigger device 120. In one embodiment, suitable image capture devices can include, but are not limited to, analog video cameras, digital video cameras, color and/or monochrome cameras, closed-circuit television (CCTV) cameras, charged-coupled device (CCD) sensors, complementary metal oxide semiconductor (CMOS) sensors, analog and/or digital cameras, pan-tilt-zoom cameras (PTZ), infra-red imaging devices, any other device capable of capturing an image and/or image data, and any combination thereof. The image capture device 110 generally comprises the circuitry, components, and connections for transmitting the image to one or more other components of the image recognition system 100, such as the image recognition processing system 140.

The trigger device 120 is configured to initiate the image recognition process through the generation of a trigger signal. In an embodiment, the trigger device may take the form of an entry way device to a work area such as a badge reader (e.g., a wireless badge reader), keypad, door handle, etc. In this embodiment, a trigger signal may be generated by activation of the trigger device, thereby initiating the image recognition process at the entry to the work area. In another embodiment, the trigger device may take the form of an initiation device for a device (e.g., a piece of equipment in a work area). For example, the trigger device may comprise a power switch, authorization keypad, positioning handle, or the like on a device. In this embodiment, a trigger signal may be generated by the activation of the trigger device at the device. This embodiment may be useful in verifying proper use of the PPE for the particular device at the time the device is activated. In another embodiment, the trigger device may take the form of the image capture device 110 and a computer vision routine for change detection and person detection. In this embodiment, a trigger signal may be generated when a person is within the field of view of the image capture device 110.

The access device 130 may take various forms and is generally configure to provide access to a work area and/or device when the image recognition process determines that the PPE is being properly worn and/or matches the type of PPE approved for the specific work area and/or device. In an embodiment, the access device 130 may comprise a door lock, opening mechanism, device interlock, device lock-out feature, or the like. Upon a determination that the PPE for a person satisfies the criteria for a work area and/or piece of equipment, the access device may receive an activation signal and thereby grant access to a work area and/or allow for the activation of a piece of equipment.

In an embodiment, the image recognition process system 140 comprises an image extraction component 141, a PPE analysis component 144, and a communications component 147. The image recognition process system 140 may comprise a set of instructions that may be implemented on a computer comprising a processing and a non-transitory computer readable medium acting as a memory. A computer and its associated equipment are described in more detail herein.

Various image recognition algorithms may be used in one or more portions of the image recognition process system 140 to detect one or more features of the PPE and/or a person within the images. Suitable algorithms can include, but are not limited to, the background modeling/removal method, Canny imaging, Harris corner imaging, Shen-Castan edge detection, grey level segmentation, skeletonization, etc. Any of the algorithms may be used to process image data in a manner that identifies the visual features of an item of PPE and/or a person (e.g., eyes, head, arms, hands, and/or other body parts). Using the original image, any identified features, and/or any extracted portion of the image, various classification routines can be used to determine if one or more features are present in the images. For example, vector space classifier model and/or an adaptive learning algorithm (e.g., an adaboost algorithm) may be used to identify one or more features of a person and/or an item of PPE based on various classifiers. The classification routines can be based on various properties of the image, any identified features, and/or any extracted portion such as one or more edges, lines, Haar-like features, appearance features, local binary pattern, Histogram Orientation Gradient (HOG), Gabor filtered features, etc. The resulting overall process may be configured to identify one or more features of the person and/or one or more items of PPE.

The image extraction component 141 may be configured to receive the image data and determine a portion of the image corresponding to a person and/or one or more pieces of PPE. In an embodiment, the image extraction component 141 may comprise a set of instructions configured to analyze the image data from the image capture device 110 to identify a particular object or objects such as the PPE item or items and/or one or more portions of a person such as the person's shoulders and head. For example, edges of objects in the image may be identified by detecting significant changes in contrast levels from one set of pixels to an adjacent set of pixels. A group of intersecting edges may form a Region of Interest (ROI) and the shape of the resulting ROI may be analyzed to determine if one or more PPE items are present and their approximate location on the person. Another example may detect a face or a person based on classification on the extracted features, such as Harr features.

The image extraction component 141 may comprise an image storage 142 configured to store the image data during the image recognition process. In an embodiment, the image storage 142 may comprise a circular storage buffer configured to maintain a buffer of images from the image capture device. Upon activation of the trigger device, the images obtained prior to the activation of the trigger device can be retrieved and used as the background reference data in the image recognition process. The circular storage buffer generally comprises a memory structure in which the image data may be stored in sequence in the image storage component 142 until the end of the available memory is reached, and then storing may begin again at the start of the image storage component 142, overwriting the oldest stored image data. In other embodiments, other memory structures may be employed.

In an embodiment, the image recognition processing system 140 may comprise a background removal component 143. In this embodiment, the image extraction component 141 may rely on a reference or background image for comparison with a captured image or images and perform image subtraction to identify those pixels that have changed between the two images. The remaining image data may form the ROI, which can then be analyzed to identify a particular object or objects such as the PPE item or items and/or one or more portions of a person. The image analysis process is described in more detail below.

The PPE analysis component 144 may be configured to analyze the image and/or an extracted portion of the image to identify the proper position/placement of the PPE and/or the use of the proper kind/type of PPE by the person. In an embodiment, the PPE analysis component may comprise a PPE positioning component 145 and/or a PPE identification component 146. The PPE positioning component 145 may be configured to analyze image data and identify the positioning of any PPE present relative to the body of the person. For example, the PPE positioning component may be configured to identify the positioning of any goggles relative to the head of a person, and specifically identify if the goggles are covering the eyes of the person in an image of the person's head. The PPE positioning component 145 may also detect and signal the absence of a PPE. The PPE identification component 146 may be configured to analyze the image data and determine the kind of PPE being worn. The PPE identification component 146 may be further configured to determine the type of PPE being worn, and in an embodiment, may further identify any number of sub-types of the PPE following the hierarchy of kind/types available for the specific PPE.

The communication component 147 may be configured to provide communication from the image recognition system and one or more additional components of the image recognition system 100 such as the image capture device 110, the trigger device 120, the access device 130, and/or the storage 150 using a suitable wired and/or wireless connection (e.g., a WiFi connection). Examples of components used to form the communication component 147 can include, but are not limited to, wireless access points, internet routers, network gateways, as well as other type of communication equipment, and any combinations thereof. In an embodiment, communication component 147 may connect the image recognition processing system 140 to a TCP/IP based network 160. In some embodiments, suitable wired connections between the components of the image recognition system 100 may include a USB, a Firewire or a serial connection. Further, embodiments may be implemented using an integrated device that includes the image capture device 110, trigger device 120, and components of the image recognition processing system 140.

The memory 150 may comprise various types of information used and/or generated by the image recognition processing system 140. In an embodiment, the memory 150 may comprise the PPE information 151, safety standards information 152, image references 153, an access log 154, and/or a compliance log 155. In general, the memory comprises a non-transitory computer readable medium and may be implemented as a single memory device or a plurality of memory devices, which may be co-located or distributed across a network. Suitable memory devices are disclosed in more detail herein.

The PPE information 151 may comprise information including descriptions of the various pieces of PPE associated with a work area and/or piece of equipment. For example, the descriptions may include image pixel patterns associated with the required PPE items (e.g., goggle). The information may include the hierarchy descriptions including the kinds of PPE, the types of PPE associated with each kind of PPE, and optionally any number of sub-types and levels of sub-types associated with PPE for the work area and/or piece of equipment.

In addition, to the PPE descriptions, the PPE information 151 may comprise descriptions of various coded marking patterns used to identify the types and/or sub-types of PPE. Any number of coded markings can be used to identify the particular types of PPE. The coded markings may be configured to provide for the identification of the PPE within the image data and/or an extracted portion of the image. Suitable coded markings may include, but are not limited to, color code patterns, color-symbol patterns, an asymmetrical pattern, a two dimensional bar code, a shot code, a SEMA-CODE, a color light pattern, or the like. The selection of the coded marking for use with a particular PPE may depend on the available surface area for placing the coded marking on the PPE, the type of material used to form the PPE, the resolution and expected distance from the camera to the coded marking, and the lighting conditions in the vicinity of the camera. In an embodiment, the coded markings may comprise various types of materials including coatings that may absorb and/or reflect various wavelengths of light including, but not limited to, infrared (IR) reflective and/or absorptive coatings, ultraviolet (UV) reflective and/or absorptive coatings, and the like. The use of coatings that may be transparent (e.g., IR coatings) to the naked eye and may allow the coded markings to be placed inconspicuously on a piece of PPE and/or in the line of sight on eye protection PPE (e.g., on the lens). This may allow for the placement of a larger coded marking on the PPE than may otherwise be possible. When coatings that are transparent to the naked eye are used, an appropriately configured image capture device may be used. For example, when an IR coating is used to form the coded markings, an image capture device may not comprise an IR filter to allow the IR radiation to reach the image sensor.

Figure 2A:
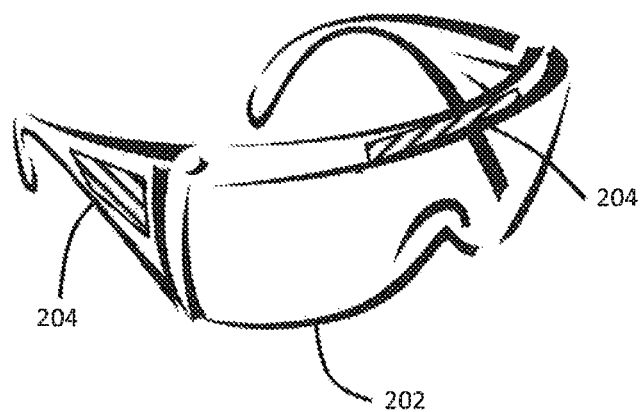
FIGS. 2A-2C illustrate views of embodiments of coded markings on an item of PPE.
Figure 2B:
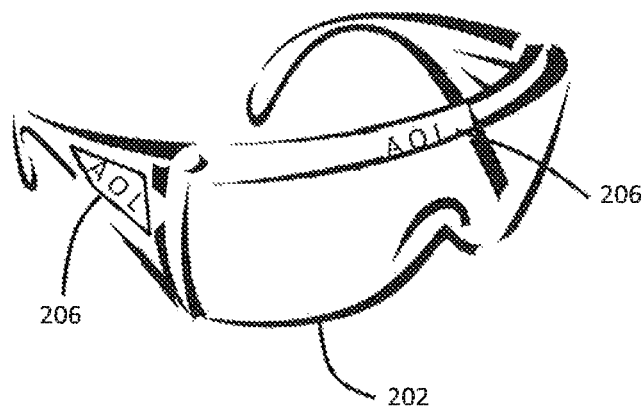
Figure 2C:
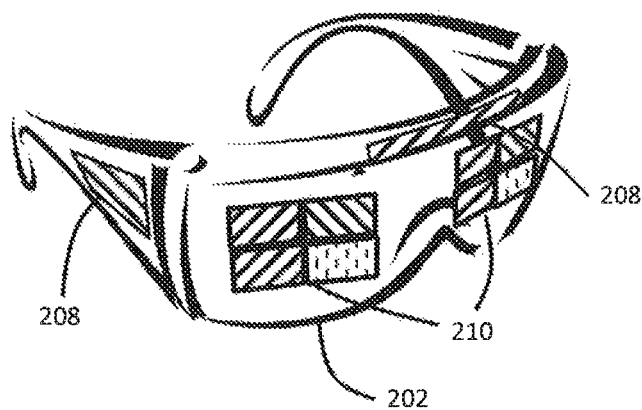

FIGS. 2A-2C illustrate examples of PPE comprising coded markings. In the illustrated embodiments, the PPE comprises goggles 202 having markings disposed on various portions. FIG. 2A illustrates that the coded marking 204 can be placed on a brim of the glasses 202 and/or an earpiece of the glasses 202. FIG. 2B illustrates a symbol code 206, which can be used along with variations in the color of the individual symbols to aid in the coded marking interpretation. FIG. 2C illustrates an embodiment in which the coded markings 208 may be disposed on a brim of the glasses 202, an earpiece, along with coded markings 210 on one or more lenses of the glasses 202. In this embodiment, the coded markings 210 on the lenses may comprise transparent markings capable of being captured by the image capture device. While the use of the coded marking may be disposed at a single location, the use of the coded markings in multiple locations may be useful in allowing the image data to capture the coded mark at different viewing angles. In addition, the image processing system may use a plurality of coded marking images to provide for error reduction in filling in any missing symbols or portions of the coded mark not viewable at one or more viewing angles as well as providing an increased confidence level based on a plurality of coded marking readings.

Returning to FIG. 1, the safety standards 152 may comprise information related to the PPE standards for a certain area and/or piece of equipment. The PPE standards may be used as a comparison against the PPE determined to be present by the image recognition system 140 during the analysis process. Similarly, the image references 153 may comprise information related to PPE references and/or background references for use with the image analysis process. These references, which may be in form of images, their extracted features or their statistical models, may be used for developing the image recognition system and/or for comparison with the PPE determined to be present by the image recognition system 140.

The access log 154 provides a log file used to record a variety of information regarding the results of the image recognition processing. For example, access log 154 may store an indication of who was (or was not) granted access to a work area. Such information may be used to help improve compliance with workplace safety rules, e.g., by identifying individuals demonstrating a pattern of non-compliance, or identifying trends of either false positives or false negatives.

Similarly, the compliance log 155 may comprise information related to one or more of the image recognition events. For example, records of each identified person, the relative positioning of any identified PPE on the person, the kind/type of PPE identified and/or not identified, and any other parameters associated with the image recognition system that may be useful in providing training and/or predicting additional needs for PPE.

The image recognition system 100 may also comprise an output device 170. The output device may be configured to receive data from the image recognition processing system 140 and output the information to one or more people. When compliance with the PPE standards is detected, the information may comprise an indication that access to the work area and/or device is granted. Alternatively, when compliance is not detected, the information may include, for example, an indication as to the proper PPE required, the proper positioning of the PPE on the person, a warning concerning the effects of non-compliance, and any other information that may be useful in informing the person of the proper PPE standards. The output device 170 may be positioned proximate the other components of the system and/or the output device 170 may be in a control room to allow an operator to view the results of the image recognition process occurring at an access point and/or a piece of equipment.

Figure 3:
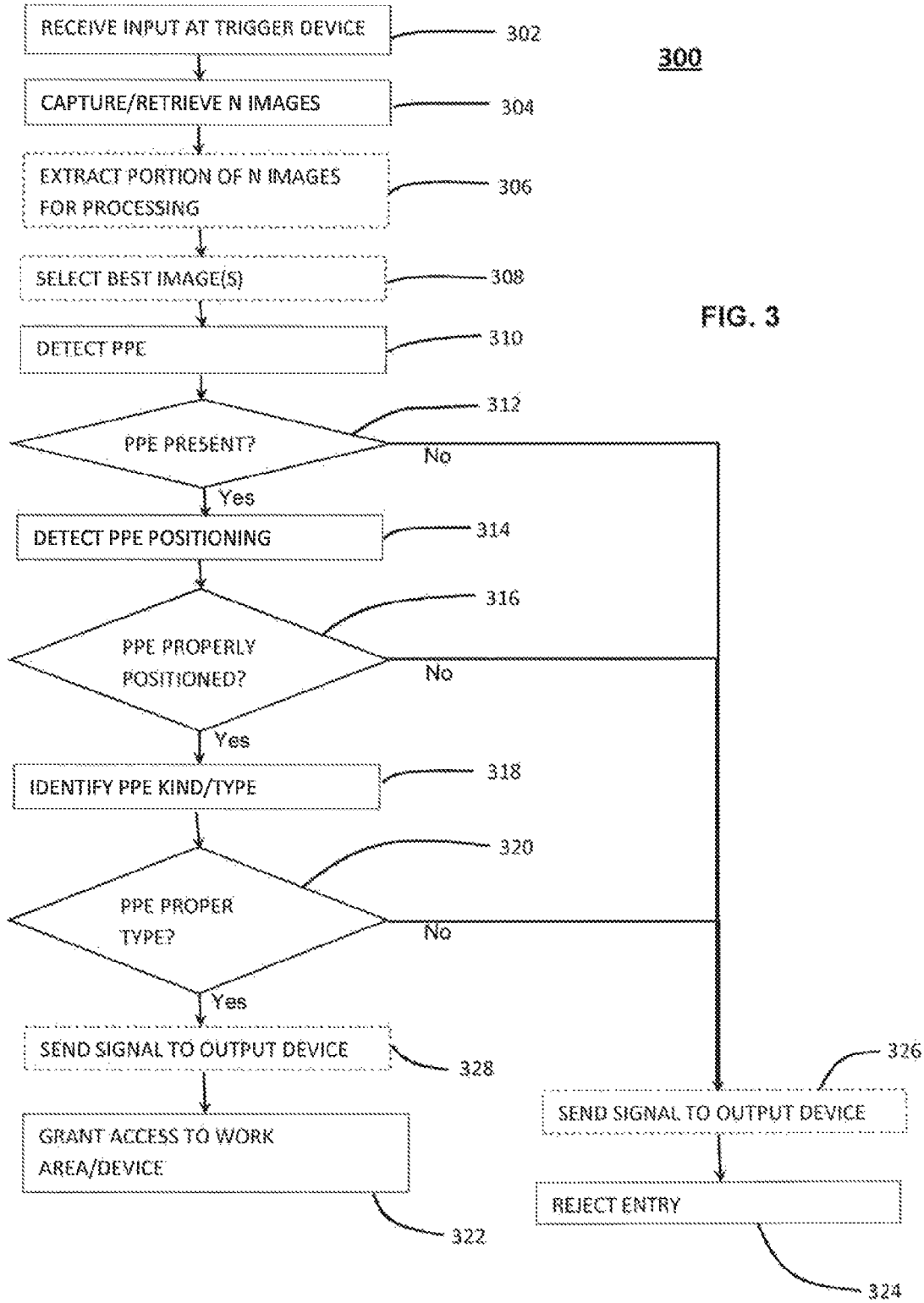
FIG. 3 illustrates a flow chart of an embodiment of a method of determining compliance with PPE standards.

FIG. 3 illustrates an embodiment of a method 300 for using an image recognition system for detecting worker compliance with standards for using PPE. With reference to FIGS. 1 and 3, the method 300 begins at step 302 with receiving an input at the trigger device 120. For example, the input may comprise an input by a person at an entryway device such as a badge reader. The person may approach the trigger device 120 and activate the badge reader by swiping an employee badge or using a near-field communication process to wirelessly detect the employee badge at the reader. Any of the other trigger devices discussed above may be similarly activated and generate a trigger signal that may be transmitted to the image recognition processing system 140.

At step 304, a set of n images may be captured by the image capture device 110 and/or retrieved from the image storage 142. In an embodiment, the image capture device 110 may be activated in response to the trigger signal and capture a set of n images. The number of n images may range from 1 to about 1,000 depending on the type of image capture device 110 used, the amount of image storage available, and the number of images the image recognition processing system can accept and process. In an embodiment, the image storage 142 comprises a circular buffer, and the trigger signal may result in a set of n images stored in the circular buffer being retrieved from the image storage 142 for processing. For example, the images captured while the person approaches and activates the trigger device 120 may be used for processing.

At step 306, one or more portions of the set of images can be extracted. In an embodiment, the image extraction component 141 may receive the set of images obtained at step 304 and determine one or more portions of the image corresponding to a person and/or one or more pieces of PPE. When multiple pieces of PPE are present and being detected, the corresponding portions of the person's body may be extracted for analysis. For example, when a work area and/or device requires both goggles and boots, the portions of the image corresponding to the person's head and feet may both be extracted. As discussed above, for example, the image extraction component 141 may identify edges of objects in the image by looking for significant changes in contrast levels from one set of pixels to an adjacent set of pixels. Further, the image and/or any extracted portion of the image may be compared with patterns associated with the required PPE items.

In an embodiment, the one or more portions of the set of images may be extracted using a background modeling/removal routine. As discussed above, the image extraction component 141 may rely on a reference or background image, which may be stored for example in the image reference 153 component of the memory 150. The reference or background model may be compared with a captured image or images and a background removal method may be performed to identify the foreground data. The foreground data may form the regions of interest, which can then be analyzed to identify a particular object or objects such as the PPE item or items and/or one or more portions of a person. Within each image, a body portion may be identified using available detection methods. For example, when the PPE standards include the person wear goggles, the head and/or face of the person may be identified using available identification routines. Any of the image recognition algorithms and/or methodologies discussed above can be used to identify the body portion of the person.

At step 308, an image comprising the one or more portions of the set of images may be selected from the available set of images. The image may be selected based on the ability to detect the PPE within the extracted image, and/or the position of the person relative to the image capture device 110. For example, the set of images may include images in which a person is both facing the image capture device and disposed at an angle with respect to the image capture device. The images in which the person is facing the image capture device 110 may allow the image recognition processing system 140 to identify the PPE with the highest confidence level. Each image may be ranked according to a confidence level or any other criteria, and the image best satisfying the criteria may be selected as the image to be analyzed. Multiple images may be selected, for example, each image best satisfying the criteria may be selected for one of the PPEs on the person.

At step 310, the image may be analyzed to determine if one or more items of PPE are detected within the image. As discussed above, a variety of image recognition routines may be used to identify a type of PPE on a person. One or more image references 153 may be used to develop the image recognition routine to identify an object in the image as a kind of PPE. Any of the image recognition routines may be used to determine if one or more items of PPE are present in the image. For example, the image may be analyzed to determine if any goggles appear in the image. The image may then be processed as the extracted portion including the portion of the person's body. In an embodiment, the image may be analyzed to extract only the detected PPE to verify the presence and kind of PPE in the image.

A decision may then be made at step 312 to determine whether the PPE appears in the image. If the PPE appears in the image, the image recognition process may continue to step 314, otherwise the image recognition process may proceed to step 324 in which entry into the work area and/or authorization to access the access device is denied. Alternatively or in addition to denying access, a message may be transmitted to the output device 170 to instruct the person of the proper PPE for the work area or device.

When the PPE is detected at step 312, the method may proceed to step 314 where the PPE positioning in the image is detected. In an embodiment, the relative positioning of the identified body portion of the person may be analyzed with respect to any PPE identified at step 310. For example, any identified goggles may be compared to the person's head to determine if the goggles are covering the person's eyes. Such a placement of the goggles relative to the person's head would indicate that the goggles were properly positioned. Should the goggles be identified above the person's eyes, for example pushed up on the person's head, then the identification of the positioning would indicate that while the goggles were present, they were not properly positioned. At step 316, a decision is made to determine if the identified PPE is being properly worn. In an embodiment, the PPE positioning component 145 may retrieve information from the PPE information store 151 to determine the proper positioning of the PPE relative to the identified body part in order to identify what positioning of the PPE is the proper positioning on the person. If the PPE is properly positioned, the image recognition process may continue to step 318, otherwise the image recognition process may proceed to step 324 in which entry into the work area and/or authorization to access the access device is denied. Alternatively or in addition to denying access, a message may be transmitted to the output device 170 to instruct the person of the proper PPE positioning.

When the PPE is properly positioned, the type of PPE in the image may be identified at step 318. In an embodiment, the PPE portion of the image may be extracted for analysis. Using the overall image, the portion of the image including the body portion of the person, and/or the PPE portion of the image, the PPE identification component 146 may be configured to identify one or more identifiers or markings on the identified PPE in the image. In an embodiment, the markings may comprise any of the coded markings described above. When multiple markings are identified, one or more of the markings may be used to identify a single coded marking identifying the type of PPE. The coded marking may be compared with a corresponding list of PPE types and/or sub-types stored in the PPE information 151.

Once identified, the type and/or sub-type of PPE may be compared with the safety standards information 152 for the work area and/or device to determine if the PPE is not only the proper kind of PPE, but also the specific type of PPE for the particular work area and/or device in step 320. For example, the PPE may have been identified as being goggles in step 310. However, numerous types of goggles are known and the work area may require a specific type of laser protective goggle. One or more markings on the goggles may then be used to identify the specific type of goggle (e.g., a laser protective goggle) and a specific sub-type of goggle (e.g., a laser protective goggle for a specific type of laser). If the PPE is the proper type and/or sub-type, the image recognition process may continue to step 322 where access to the work area and/or device is granted. The combination of the method 300 and the decision steps 312, 316, and 318 may be referred to as verifying the compliance with personal protective equipment standards based on the one or more identified items of personal protective equipment and the positioning of the one or more items of personal protective equipment.

An optional signal 328 may be sent to the output device 170 indicating that access is granted. Otherwise the image recognition process may proceed to step 324 in which entry into the work area and/or authorization to access the access device is denied.

Alternatively or in addition to denying access, a message may be transmitted to the output device 170 to instruct the person of the proper PPE type for use in the work area and/or with the device in step 326. In an embodiment, the message may be used to active a safety feature configured to prevent, reduce the likelihood of, or reduce the degree of, an injury to one or more people, or damage to one or more items. For example, the activation of the safety feature may discontinue power to a device, and/or interject a physical barrier or restraint between a person and a source of potential injury. Alternatively, the safety control device may be in the form of an alarm to alert one or more individuals (e.g., the person, the person's manager, a site supervisor, etc.) to the heightened risk associated with an unsafe condition. In another embodiment, the safety feature may generate and transmit a report to a production manager, a site supervisor, a safety officer, etc. for the purpose of modifying behavior so that the unsafe condition is less likely to occur in the future.

When access is granted and/or denied, the result and the supporting information may be stored in the access log 154. Information related to one or more of the image recognition events may also be sent to the compliance log 155. The information in the access log 154 and/or the compliance log 155 may be used to improve compliance with workplace safety rules that require workers to use and/or wear certain PPE items (e.g., safety glasses, protective head gear, etc.). Further action may be taken based on the information in the access log 154 and/or the compliance log 155 such as determining new PPE standards, determining training standards for people assigned to a work area and/or device, rewarding and/or disciplining specific actions of individuals, and/or modifying the image recognition process system 140 to improve identification of PPE items, people, and the kind/type of the PPE.

The system 100 and method 300 may be used as an access point control for improving person compliance with PPE standards. In some embodiments, worker compliance may also be monitored during activities taking place in a work area. In many work areas, video monitoring may be used to monitor one or more devices within the work area at an operator station. However, this form of monitoring relies upon an operator to analyze the video and report any incidents. When combined with the image recognition system as disclosed herein, video monitoring of a work area may be used to automatically identify a person within a work area along with determining if the person complies with PPE standards.

Figure 4:
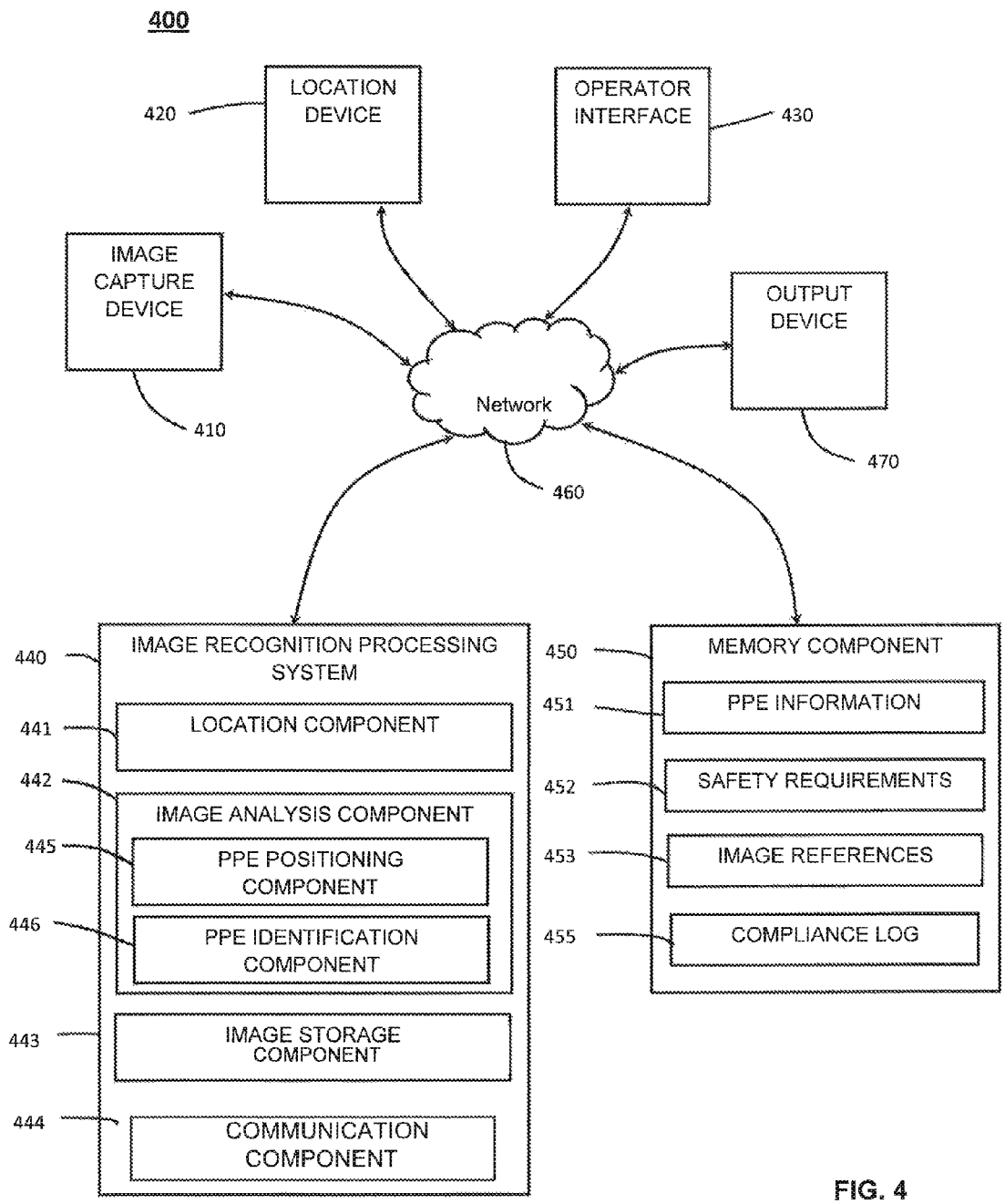
FIG. 4 illustrates another schematic view of an embodiment of an image recognition system.

FIG. 4 illustrates an embodiment of an image recognition system 400 configured to detect compliance with standards for using PPE within a work area. The system 400 may be used in a work area for monitoring compliance with PPE standards, which can vary or be the same throughout the work area. The system 400 includes an image capture device 410, a location device 420, an operator interface device 430, an image recognition processing system 440, and an output device 470 all coupled by a network 460. In an embodiment, any of the elements may be directly coupled rather than be coupled through a network or network elements, and one or more of the components be integrated into a single unit.

One or more image capture devices 410 may comprise any of the image capture devices described above with respect to FIG. 1. In an embodiment, the image capture device comprises one or more cameras configured to provide one or more of pan, tilt, or zoom capabilities. The cameras can be configured to accept an input signal to actuate the cameras to pan and/or tilt in a desired direction and/or zoom into a particular location. The image capture devices may be located within the monitored work area, as would be the case with a plurality of surveillance cameras. In an embodiment, one or more of the image capture devices may be located outside the work area, but may be configured to obtain images of the work area. For example, one or more cameras can be located at a distance from the work area while being configured to zoom to and obtain images of the work area. In general, the one or more image capture devices 410 are configured to obtain one or more images of a person within a work area and provide the images to the image recognition processing system 440.

The location device 420 can comprise any of a number of devices configured to provide the location of a person to the image recognition processing system 440. A variety of devices can be used to obtain the location of a person within a work area. In an embodiment, the location device 420 may comprise one of a group of near field communication (NFC) devices including, but not limited to, infra-red devices, ultra-sonic devices, optical devices, RFID devices, wireless devices, Bluetooth based devices, Wi-Fi based communication devices, and any other communication links that do not involve direct physical contact. The location device 420 can be associated with a person (e.g., as part of an employee badge), an item of PPE possessed by a person, and/or a mobile device carried by the person. A plurality of readers configured to communicate with a particular device can be placed throughout the work area.

Various location methods such as cell based identification and/or triangulation may be used to determine the location of a person within the work area. For example, a grid of RFID readers may be located throughout a work area, with each reader configured to read RFID devices within a specified distance of the RFID reader. The resulting "grid" may segment the larger work area into smaller zones. When a single RFID reader within the work area detects the RFID device associated with a person and/or PPE, the person's location can be determined to be within the segment associated with the particular single RFID reader. When a plurality of RFID readers detects the RFID device, the person's location can be determined to be within an area of overlap between the individual segments associated with each of the plurality of RFID readers. The spatial certainty of the person's location can then be determined by the area read by each reader and the degree to which the area of each reader overlaps. In an embodiment, the readers associated with the location device 420 can perform the location determination and/or a location component 441 of the image recognition processing system 440 may receive the information from one or more of the readers and determine the position of the person, as described in more detail below.

In an embodiment, the location device 420 may comprise one or more location positioning devices configured to directly determine the location of the person and communicate the position information to the image recognition processing system 440 through the network 460. Suitable location devices may include one or more devices comprising a global positioning system (GPS) device and/or a device comprising a location processing component. In general, the GPS device may receive signals from positioning satellites and determine a location based on the signals. GPS devices can be limited by the ability to detect the satellite signals. Alternatively, the cell based and/or triangulation methods described above can be carried out by a location processing component on a mobile device carried with the person. The mobile device can then communication the location information to the image recognition processing system 440 through the network.

The image recognition processing system 440 is similar to the image recognition processing system described above with respect to FIG. 1. For example, the communication component 444 may be substantially similar to the communication component described with respect to FIG. 1. In an embodiment, the image recognition processing system 440 is configured to capture one or more images of a person within a work area based on the person's location and monitor the person's compliance with the applicable PPE standards. If the image recognition processing system 440 determines that a person does not comply with the applicable PPE standards for the work area and/or a location within a work area, the image recognition processing system 440 may provide an output signal to an output device 470 and/or an operator interface 430 in the form of an alarm or PPE standard violation report.

The image recognition processing system 440 may include, but is not limited to, a location component 441, an image analysis component 442, an image storage component 443, and a communication component 444. The location component 441 may be configured to determine the location of a person within a work area based on the location device 420. As described above, the location device 420 may be sensed and/or read by a plurality of corresponding location device readers placed throughout the work area. When a location device 420 is detected by a location device reader, a signal may be sent from the location device reader, through the network 460, to the location component 441. Upon receiving one or more location signals, the location component 441 may determine a location of the location device 420 within the work area, which may be used to determine the location of the person within the work area. In another embodiment, the location component 441 may receive the location of the person directly from the location device 420, such as when the location device 420 comprises a GPS transceiver.

Once the location of the person has been determined by the location component 441, a camera signal may be generated to direct the one or more image capture devices 410 to the location of the person. The camera signal may comprise an indication of a portion of a camera image containing the person, thereby allowing for the corresponding portion of the image to be extracted for use in the image recognition processing (e.g., a digital zoom or isolation). Alternatively, the camera signal may comprise a control signal directing the image capture device to pan, tilt, and/or zoom (e.g., optical zoom) to the location of the person. The appropriate control signals can be determined based on the known orientations of the image capture devices and/or calibrated using an initial calibration procedure prior to using the image capture devices. The control signal may result in one or more of the image capture devices focusing on the person's location in order to obtain one or more images of the person.

Once one or more of the image capture devices 410 are directed to the location of the person, the image capture devices may obtain one or more images of the person. The images may be stored in the image storage component 443 and used with the image analysis component 442. The image storage component 443 may be configured to store the image data during the image analysis and recognition process. In an embodiment, the image storage 443 may comprise a circular storage buffer that is the same or similar to the image storage described with respect to FIG. 1. Alternatively, the image storage 443 may comprise an image storage device configured to receive and store the output of one or more of the image capture devices 410 on a non-transitory computer readable media for later retrieval and analysis. The image analysis component 442 may be the same or similar to the image extraction component 141 and/or the PPE analysis component 144 of the image recognition processing system of FIG. 1. In an embodiment, the image analysis component 442 may be configured to receive the one or more images of the person from the one or more image capture devices 410 and determine a person's compliance with the PPE standards for the work area where the person is located.

The image analysis component 442 may comprise a set of instructions configured to analyze the image data from the image capture device 410 to identify a particular object or objects such as the PPE item or items and their relative positioning with respect to the person. For example, edges of objects in the image may be identified by detecting significant changes in contrast levels from one set of pixels to an adjacent set of pixels. A group of intersecting edges may identify a portion of the image for extraction, and this portion may be analyzed to determine if one or more PPE items are present and their approximate location on the person. In an embodiment, the image analysis component 442 may rely on a reference or background model for comparison with a captured image or images and perform background removal routine to identify those foreground data. The foreground data may then be analyzed to identify a particular object or objects such as the PPE item or items and/or one or more portions of a person.

In an embodiment, the image analysis component 442 may be configured to verify the person's compliance with the PPE standards for a work area by verifying that the appropriate kind of PPE is present and properly positioned on the person in the work area. In this embodiment, the image analysis component 442 may comprise a PPE positioning component 445 configured to analyze the one or more images and verify the existence and positioning of the PPE. Verification of the proper positioning of the PPE may be used, for example, when the work area surveillance system is combined with an entryway/access control system. In this embodiment, the entryway/access control system (e.g., using the image recognition system 100) may be used to verify that the PPE is of the appropriate type and/or sub-type as described above, while the image recognition system 400 can be used to verify continued compliance with the PPE standards during use in a work area.

In some embodiments, the image analysis component 442 may optionally also verify that in addition to being the proper kind or PPE for the work area, the PPE is also of the proper type and/or sub-type. In this embodiment, the image analysis component 442 may comprise a PPE identification component 446. The PPE identification component 446 may be configured to analyze the image data and/or any portion of the image data and determine the kind of PPE being worn. The PPE identification component 446 may be further configured to determine the type of PPE being used, and in an embodiment, may further identify any number of sub-types of the PPE following the hierarchy of kind/types available for the specific PPE.

The memory 450 may comprise various types of information used and/or generated by the image recognition processing system 440. The memory 450 may be the same or similar to the memory described above with respect to FIG. 1. In an embodiment, the memory 450 may comprise the PPE information 451, safety standards information 452, image references 453, and/or a compliance log 455. In general, the memory comprises a non-transitory computer readable medium and may be implemented as a single memory device or a plurality of memory devices, which may be co-located or distributed across a network. Suitable memory devices are disclosed in more detail herein. Each component of the memory 450 may be the same or similar to the corresponding memory components described with respect to FIG. 1. While each component of the memory 450 is described briefly for clarity, it is expressly understood that each component may comprise one or more of the elements described with respect to the corresponding components discussed with respect to FIG. 1.

The PPE information 451 may comprise information including descriptions of the various pieces of PPE associated with a work area and/or a location within a work area. For example, the descriptions may include image pixel patterns associated with the required PPE items (e.g., goggles, ear plugs, hard hats, etc.). The information may include the hierarchy descriptions including the kinds of PPE, the types of PPE associated with each kind of PPE, and optionally any number of sub-types and levels of sub-types associated with PPE for the work area and/or piece of equipment. When the type of PPE is to be identified, the PPE information 451 may also comprise descriptions of various coded marking patterns used to identify the types and/or sub-types of PPE. The coded markings may comprise any of those markings discussed herein.

The safety standards 452 may comprise information related to the PPE standards for a certain work area and/or a location within a work area. The PPE standards may be used as a comparison against the PPE determined to be present by the image recognition system 440 during the analysis process. Similarly, the image references 453 may comprise information related to PPE references and/or background image references for use with the image analysis process. These images may be used for developing the image recognition system and/or for comparison with the PPE determined to be present by the image recognition system 440.

The compliance log 455 may comprise information related to one or more of the image recognition events. For example, records of each identified person, the relative positioning of any identified PPE on the person, the kind/type of PPE identified and/or not identified, and any other parameters associated with the image recognition system that may be useful in providing training and/or predicting additional needs for PPE.

The image recognition system 400 may also comprise an output device 470. The output device may be configured to receive data from the image recognition processing system 440 and output the information to one or more people. The output device may comprise any number of device such as an audio device for issuing a warning signal, a lighting device for issuing a visual indicator, an audio/visual device for presenting information to the person, and/or a mobile device associated with the person for receiving communications through the network 460 about the PPE standards. The data displayed on the output device 470 may comprise an indication that the person has complied with the PPE standards, has not complied with the PPE standards, instructions on complying with the PPE standards (e.g., proper positioning information, proper PPE kind/type information, etc.), incident report information, and/or the like.

In some embodiments, the image recognition system 400 may comprise an operator interface 430. The operator interface 430 may be configured to present the one or more images of the person and any information determined about the compliance of the person in the work area with the PPE standards to an operator. For example, the operator interface may be located in a control room to allow an operator to view the results of the image recognition process occurring within a work area. The operator may then be able to take an appropriate action based on the information presented on the operator interface 430.

Figure 5:
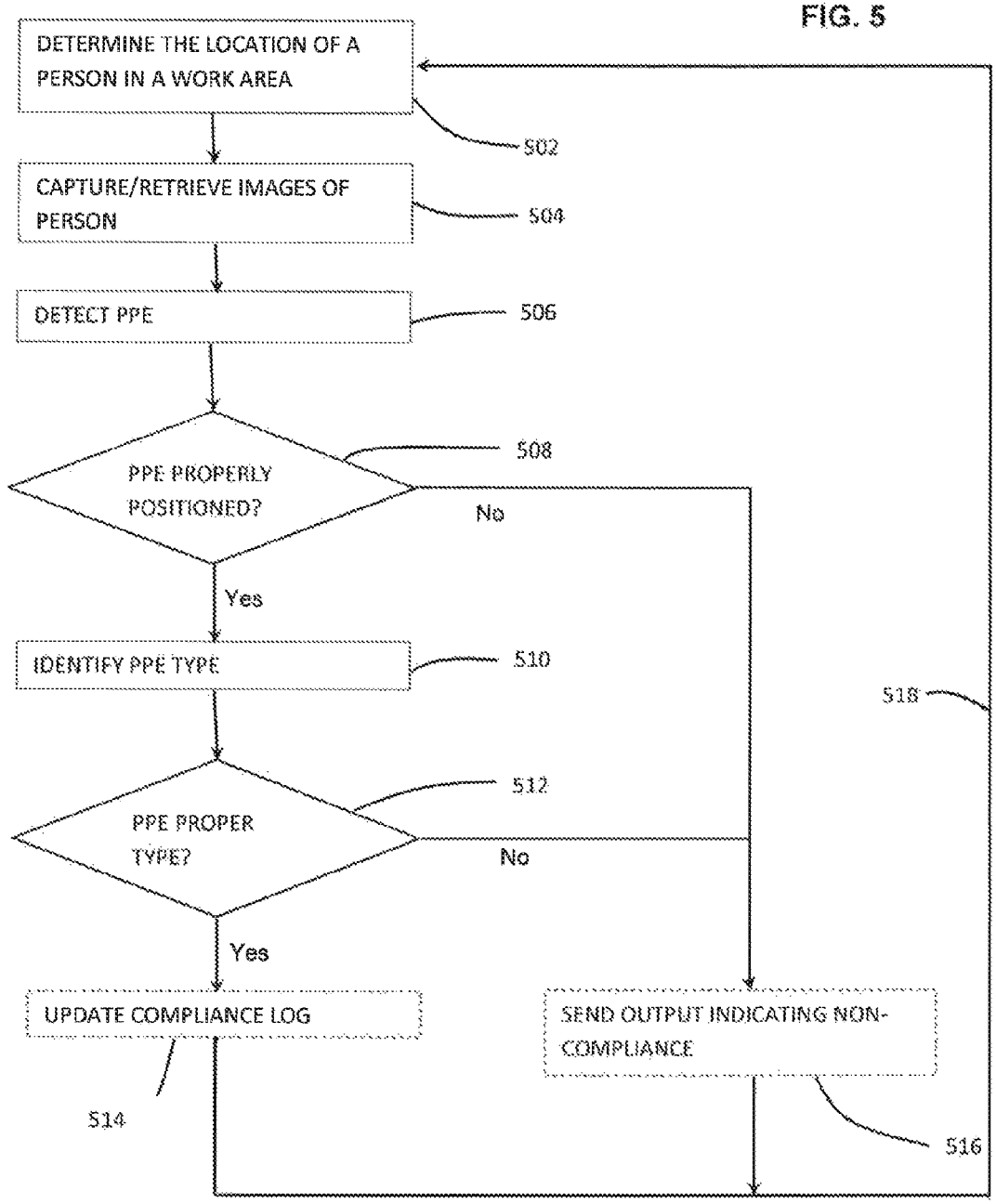
FIG. 5 illustrates another flow chart of an embodiment of a method of determining compliance with PPE standards.

FIG. 5 illustrates an embodiment of a method 500 for using an image recognition system for detecting worker compliance with the PPE standards in a work area and/or location within a work area. With reference to FIGS. 4 and 5, the method 500 begins at step 502 with detecting the location of a person in a work area. In an embodiment, any of the location determination methods disclosed herein may be used to determine the location of the person within the work area. The location determination may include a determination of the general location within the work area where the person is currently positioned, and/or the location determination may include a determination of a specific location within the work area, which may have varying PPE standards throughout the work area.

At step 504, a set of one or more images may be captured by the one or more image capture devices 410 and/or retrieved from the image storage 443. In an embodiment, the image capture devices 410 may be activated in response to the location determination and capture the one or more images. When the location of the person allows for multiple image capture devices 410 to view the person, each of the image capture devices may capture one or more images of the person. In an embodiment, the one or more images can comprise a video stream comprising a plurality of individual images. For example a video image comprising a plurality of individual images may be captured by a PTZ camera having received a camera control signal and having focused on the person. In an embodiment, the image storage 443 can comprise a circular buffer, and the location determination may result in the images stored in the circular buffer being retrieved from the image storage 443 for processing.

At step 506, the person's compliance with the PPE standards is detected. In an embodiment, the image analysis component 442 may analyze the images to determine the person's compliance with the PPE standards for the work area. The analysis may extract one or more portions of the one or more images corresponding to the person and/or one or more items of PPE.

When multiple pieces of PPE are present and being detected, the corresponding portions of the person's body may be extracted for analysis. For example, when a person is required to have both goggles and boots, the portions of the image corresponding to the person's head and feet may both be extracted. As discussed above, the image analysis component 442 may identify edges of objects in the image by looking for significant changes in contrast levels from one set of pixels to an adjacent set of pixels. Further, a group of intersecting edges may be used to identify a portion of the image, and the portion of the image may be compared with patterns associated with the required PPE items.

In an embodiment, the one or more portions of the set of images may be extracted using a background modeling/removal routine. The image analysis component 442 may rely on a reference or background image, which may be stored for example in the image storage component 443, for comparison with the one or more images and perform image subtraction to identify those pixels that have changed between the two images. The changed portions of the one or more image can then be analyzed to identify a particular object or objects such as the PPE item or items and/or one or more portions of a person.

The one or more images may be analyzed to determine if one or more items of PPE are identifiable within the image. As discussed above, a variety of image recognition routines may be used to identify the kind of PPE in the one or more images. One or more image references 453 may be used to develop the image recognition routine to identify an object in the image as a kind of PPE. When multiple images are available, each may be analyzed to determine if the one or more items of PPE are identifiable within the image. An average, weighted averaging, running total, or other determination routine may be used to form a decision as to whether a type of PPE is present in the plurality of images. This process may aid in preventing false positive and/or false negatives by basing the results on a plurality of images. For example, the PPE may be occluded from view in one or more images due to the orientation of the person or a component of the work area being disposed between the image capture device and the person. Analysis of this image alone may give a false finding that the person is not complying with the PPE standards. However, when a plurality of images are analyzed, the additional images may provide the appropriate identification of PPE within the images, and a weighting, averaging, or other process for considering multiple images may allow for the appropriate finding that the PPE is present in the image.

When an item of PPE is detected, compliance with the PPE standards can be determined by analyzing the image to determine the positioning of the PPE relative to the person using the PPE positioning component 445. In an embodiment, the relative positioning of the identified body portion of the person may be analyzed with respect to any PPE identified. For example, any identified goggles may be compared to the person's head to determine if the goggles are covering the person's eyes. Such a placement of the goggles relative to the person's head would indicate that the goggles were properly positioned. Should the goggles be identified above the person's eyes, for example pushed up on the person's head, then the identification of the positioning would indicate that while the goggles were present, they were not properly positioned.

At step 508, a decision is made to determine if the identified PPE is properly positioned. In an embodiment, the image analysis component 442 may retrieve information from the PPE information store 451 and/or the safety standards store 452 to determine the proper kind of PPE required and the proper positioning of the PPE relative to the identified body part in order to identify if the PPE is properly positioning on the person. If the PPE is properly positioned, the image recognition process may continue to step 510, otherwise the image recognition process may proceed to step 516 in which an output signal indicative of a non-compliant state is generated. In an embodiment, the method 500 may repeat at periodic intervals, aperiodic intervals, as requested by an operator, and/or as triggered by a location determination of a person once the compliance with the PPE standards in the work area is determined in step 508 using a determination of the proper PPE positioning.

Optionally, the method 500 may proceed to step 510 to further determine compliance with the PPE standards by further determining if the proper PPE type is being used in the work area. The PPE identification component 446 may be configured to identify one or more identifiers or markings on the identified PPE in the image. The markings may comprise any of the coded markings described above. When multiple markings are identified, one or more of the markings may be used to identify a single coded marking identifying the type of PPE. The coded marking may be compared with a corresponding list of PPE types and/or sub-types stored in the PPE information 451. Once identified, the type and/or sub-type of PPE may be compared with the safety standards information 452 for the work area and/or location within the work area to determine if the PPE is not only the proper kind of PPE, but also the specific type of PPE for the particular work area and/or location within the work area. At step 512, a decision is made to determine if the PPE is the proper type and/or sub-type for the work area and/or location within the work area. When the PPE is the proper type and/or sub-type, the image recognition process may continue to step 514. Otherwise the image recognition process may proceed to step 516.

At step 514, the compliance log may be optionally updated. In particular, the determination of compliance with the PPE standards for the work area, and the supporting information (e.g., the one or more images, the identifications of the PPE, etc.) may be stored in the compliance log 455. The information in the compliance log 455 may be used to improve compliance with workplace safety rules that require workers to use and/or wear certain PPE items (e.g., safety glasses, protective head gear, etc.). Further action may be taken based on the information in the compliance log 455 such as determining new PPE standards, determining training standards for people of a work area and/or device, rewarding and/or disciplining specific actions of individuals, and/or modifying the image recognition process system 440 to improve identification of PPE items, people, and the kind/type of the PPE.

At step 516, an output signal indicative of a non-compliant state is generated. The output signal may be transmitted to the output device 470. The output signal may comprise an indication that the person has not complied with the PPE standards, instructions on complying with the PPE standards (e.g., proper positioning information, proper PPE kind/type information, etc.), incident report information, and/or the like. In some embodiments, the output signal may be sent to the operator interface 430. The operator interface 430 may be configured to present the information contained within the output signal to an operator. The operator may then be able to take an appropriate action based on the information presented on the operator interface 430.

As discussed with respect to FIG. 3, the output signal generated at step 516 may be used to active a safety feature configured to prevent, reduce the likelihood of, or reduce the degree of, an injury to one or more people, or damage to one or more items. The output signal and safety feature may utilize the location information for the person. For example, the activation of the safety feature may discontinue power to a device in the vicinity of the person in the work area, and/or interject a physical barrier or restraint between a person and a source of potential injury in the work area. Alternatively, the safety control device may be in the form of an alarm to alert one or more individuals (e.g., the person, the person's manager, a site supervisor, etc.) to the heightened risk associated with an unsafe condition. The alarm may sound in the vicinity of the person and follow the person as the person moves within the work area.

The method 500 may be loop back at 518 to repeat at periodic intervals, aperiodic intervals, as requested by an operator, and/or as triggered by a location determination of a person. The periodic monitoring of the work area may be used to aid in maintaining compliance during the time the person is present in the work area. In an embodiment, the method 500 may repeat until the person is no longer detected in the work area, for example when the person checks out of the work area at an exit point.

Figure 6:
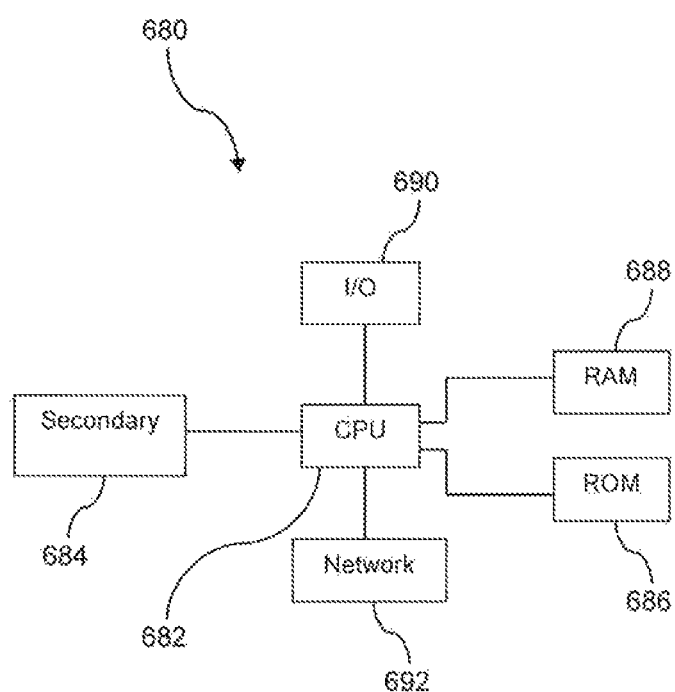
FIG. 6 illustrates a schematic view of a computer according to an embodiment.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684. The secondary storage 684, the RAM 688, and/or the ROM 686 may be referred to in some contexts as computer readable storage media and/or non-transitory computer readable media.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 684, for example, hard drives, floppy disks, optical disks, and/or other device, the ROM 686, and/or the RAM 688 may be referred to in some contexts as non-transitory instructions and/or non-transitory information.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data structures in part by directly accessing the computer program product, for example by reading from a CD-ROM disk inserted into a disk drive peripheral of the computer system 680. Alternatively, the processor 682 may process the executable instructions and/or data structures by remotely accessing the computer program product, for example by downloading the executable instructions and/or data structures from a remote server through the network connectivity devices 692. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

In some contexts, a baseband signal and/or a signal embodied in a carrier wave may be referred to as a transitory signal. In some contexts, the secondary storage 684, the ROM 686, and the RAM 688 may be referred to as a non-transitory computer readable medium or a computer readable storage media. A dynamic RAM embodiment of the RAM 688, likewise, may be referred to as a non-transitory computer readable medium in that while the dynamic RAM receives electrical power and is operated in accordance with its design, for example during a period of time during which the computer 680 is turned on and operational, the dynamic RAM stores information that is written to it. Similarly, the processor 682 may comprise an internal RAM, an internal ROM, a cache memory, and/or other internal non-transitory storage blocks, sections, or components that may be referred to in some contexts as non-transitory computer readable media or computer readable storage media.

While several embodiments of the various elements, systems, and methods have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein. Other steps may be provided in the methods described herein, or steps may be eliminated, and other components may be added to, or removed from, the systems described herein. Other embodiments may be within the scope of the following claims.

What is claimed is:

1. A personal protective equipment compliance system comprising:
    a location device;
    an access device configured to deny access to a work area unless the access device receives a compliance verification signal indicative of compliance with one or more personal protective equipment standards;
    an image capture device;
    a memory comprising a non-transitory, computer readable media;
    a processor; and
    an image recognition processing tool that, when executed by the processor, configures the processor to:
        determine a location of a person based on a signal from the location device;
        direct one or more image capture devices to the location of the person by one or more of the following: panning, tilting, zooming;
        receive one or more images from the image capture device;
        detect one or more items of personal protective equipment within the one or more images;

detect the positioning of the one or more items of personal protective equipment on a person within the one or more images when the one or more items of personal protective equipment are detected;

identify the type of the one or more items of personal protective equipment when the one or more items of personal protective equipment are detected;

verify compliance with the one or more personal protective equipment standards based on the positioning of the one or more items of personal protective equipment and the type of the one or more items of personal protective equipment; and send the compliance verification signal indicative of the compliance verification to the access device;

wherein the access device is further configured to, in response to receiving the compliance verification signal, grant access to the work area;

wherein the location device is separate and apart from the one or more image capture devices.

2. The personal protective equipment compliance system of claim 1, wherein the image recognition processing tool, when executed by the processor, further configures the processor to:

send an alert to an output device when compliance with the personal protective equipment standards is not verified, wherein the message comprises information on the personal protective equipment standards; and store information related to the compliance verification in at least one of an access log or a compliance log.

3. The personal protective equipment compliance system of claim 1, wherein one or more items of personal protective equipment comprise at least one item selected from the group consisting of: glasses, goggles, an ear plug, ear muffs, a face mask, a respirator, a hair net, a hard hat, a wrist band, gloves, a skirt, a gown, an apron, shoes, boots, a safety harness, a safety suit, a chemical suit, and any combinations thereof.

4. The personal protective equipment, compliance system of claim 1, wherein identify the type of the one or more items of personal protective equipment comprises:

identifying the kind of the one or more items of personal protective equipment; and identifying at least one of the type or a sub-type of the one or more items of personal protective equipment.

5. The personal protective equipment compliance system of claim 1, wherein the image capture device comprises a spectral camera, color video camera or infrared camera.

6. The personal protective equipment compliance system of claim 1, wherein identify the type of the one or more items of personal protective equipment comprises:

identify one or more coded markings associated with the one or more items of personal protective equipment, wherein the one or more coded markings comprise at least one of a color code pattern, a color-symbol pattern, an asymmetrical pattern, a one dimensional bar code, a standard bar code, a two dimensional bar code, a shot code, a SEMACODE, or a color light pattern.

7. The personal protective equipment compliance system of claim 6, wherein the one or more coded markings are formed from at least one of an infrared (IR) reflective coating, IR absorptive coating, an ultraviolet (UV) reflective coating, or a UV absorptive coating.

8. The personal protective equipment compliance system of claim 7, wherein the personal protective equipment comprises glasses or goggles, and wherein the one or more coded markings are located on one or more lenses of the glasses or goggles.

9. The personal protective equipment compliance system of claim 1, wherein receive one or more images comprises receiving a set of images and ranking each image of the set according to confidence level.

10. The personal protective equipment compliance system of claim 9, wherein receive one or more images from an image capture device comprises retrieving a plurality of images from a circular storage buffer, and wherein the plurality of images are received from a plurality of image capture devices which have each been directed to the location of the person.

11. The personal protective equipment compliance system of claim 9, wherein detect the positioning of the one or more items of personal protective equipment comprises analyzing the set of images and weighting or averaging the set of images to prevent false positives or false negatives.

12. The personal protective equipment compliance system of claim 1, wherein detect the positioning of the one or more items of personal protective equipment comprises extracting one or more portions of the one or more images and using a background modeling/removal routine.

13. A personal protective equipment compliance system comprising:

a trigger device, wherein the trigger device is an entry way device located at an entry way to a work area;

an image capture device;

a memory comprising a non-transitory, computer readable media;

a processor; and an image recognition processing tool that, when executed by the processor, configures the processor to:

receive a trigger signal from the trigger device;

receive one or more images from the image capture device in response to receiving the trigger signal;

detect one or more items of personal protective equipment within the one or more images;

detect the positioning of the one or more items of personal protective equipment on a person within the one or more images when the one or more items of personal protective equipment are detected;

identify the type of the one or more items of personal protective equipment when the one or more items of personal protective equipment are detected;

verify compliance with one or more personal protective equipment standards at the entry way to the work area based on the positioning of the one or more items of personal protective equipment and the type of the one or more items of personal protective equipment; and send an output signal indicative of the compliance verification;

wherein a piece of equipment is configured to, in response to an access device for the piece of equipment receiving the output signal, activate;

wherein the piece of equipment is that to which the personal protective equipment relates to for protective purposes; and wherein the trigger device is separate and apart from the one or more image capture devices.

14. The personal protective equipment compliance system of claim 13, wherein the access device comprises a lock-out feature.

15. The personal protective equipment compliance system of claim 13, wherein receive one or more images from an image capture device comprises retrieving the one or more images from a circular storage buffer.

16. The personal protective equipment compliance system of claim 15, wherein the one or more images comprise at least one image obtained prior to activation of the trigger device for use as background reference data.

17. The personal protective equipment compliance system of claim 13, wherein the image recognition processing tool, when executed by the processor, further configures the processor to:
- determine a location of a person within the work area beyond the entry way based on a signal from a location device;
- direct one or more image capture devices to the location of the person by one or more of the following: panning, tilting, zooming;
- receive one or more images from the location directed one or more image capture devices;
- detect one or more items of personal protective equipment within the one or more images from the location directed one or more image capture devices;
- detect the positioning of the one or more items of personal protective equipment on a person within the one or more images from the location directed one or more image capture devices when the one or more items of personal protective equipment are detected;
- identify the type of the one or more items of personal protective equipment when the one or more items of personal protective equipment are detected within the one or more images from the location directed one or more image capture devices;
- verify continued compliance with one or more personal protective equipment standards based on the positioning of the one or more items of personal protective equipment and the type of the one or more items of personal protective equipment as detected within the one or more images from the location directed one or more image capture devices; and
- send a second output signal indicative of continued compliance verification;
- wherein the location device is separate and apart from the one or more image capture devices.

* * * * *

UNITED STATES PATENT AND TRADEMARK OFFICE
CERTIFICATE OF CORRECTION

PATENT NO. : 9,695,981 B2  
APPLICATION NO. : 13/452596  
DATED : July 4, 2017  
INVENTOR(S) : Kwong Wing Au et al.

Page 1 of 1

It is certified that error appears in the above-identified patent and that said Letters Patent is hereby corrected as shown below:

In the Specification

Column 13, Line 18: "communication" should be "communicate"

In the Claims

Column 23, Line 38: delete the "," after "equipment"

Column 25, Line 15: insert --to-- after the word "directed"

Column 25, Line 19: insert --to-- after the word "directed"

Column 26, Line 1: insert --to-- after the word "directed"

Column 26, Line 7: insert --to-- after the word "directed"

Column 26, Line 14: insert --to-- after the word "directed"

Signed and Sealed this  
Twenty-first Day of November, 2017

Joseph Matal  
*Performing the Functions and Duties of the*  
*Under Secretary of Commerce for Intellectual Property and*  
*Director of the United States Patent and Trademark Office*